United States Patent

Fernandez et al.

[15] 3,671,652
[45] June 20, 1972

[54] COREACTED SALTS OF POLYCHLOROCARBOXYLIC ACIDS

[72] Inventors: Jaime B. Fernandez, Midland; James E. Ayers, St. Louis, both of Mich.

[73] Assignee: The Dow Chemical Company, Midland, Mich.

[22] Filed: Nov. 18, 1968

[21] Appl. No.: 776,791

[52] U.S. Cl..........................260/539 R, 71/113, 260/539 A
[51] Int. Cl......................................C07c 53/16, C07c 53/32
[58] Field of Search...........................260/539 R, 539 A, 539

[56] References Cited

UNITED STATES PATENTS

| 2,446,233 | 8/1948 | Lamborn | 260/539 A |
| 2,642,354 | 6/1953 | Barrons | 260/539 UX |
| 3,007,964 | 11/1961 | Maylatt et al. | 260/539 |

FOREIGN PATENTS OR APPLICATIONS

| 708,641 | 4/1965 | Canada | 260/539 A |
| 1,113,450 | 9/1961 | Germany | 260/539 A |

Primary Examiner—Lorraine A. Weinberger
Assistant Examiner—Jacqueline L. Davison
Attorney—Griswold and Burdick, John L. Spalding and Maynard R. Johnson

[57] ABSTRACT

Coreacted salts of polychlorocarboxylic acids with alkali metal and alkaline earth metal cations, such as sodium (90) magnesium (10) trichloroacetate or sodium (87.6) calcium (12.4) 2,2-dichloropropionate are prepared by reacting polychlorocarboxylate anion with a mixture of alkali metal and alkaline earth metal cations. The coreacted salts are free flowing crystalline solids with desirable anticaking and high bulk density properties. The coreacted salts are useful as herbicides.

15 Claims, 1 Drawing Figure

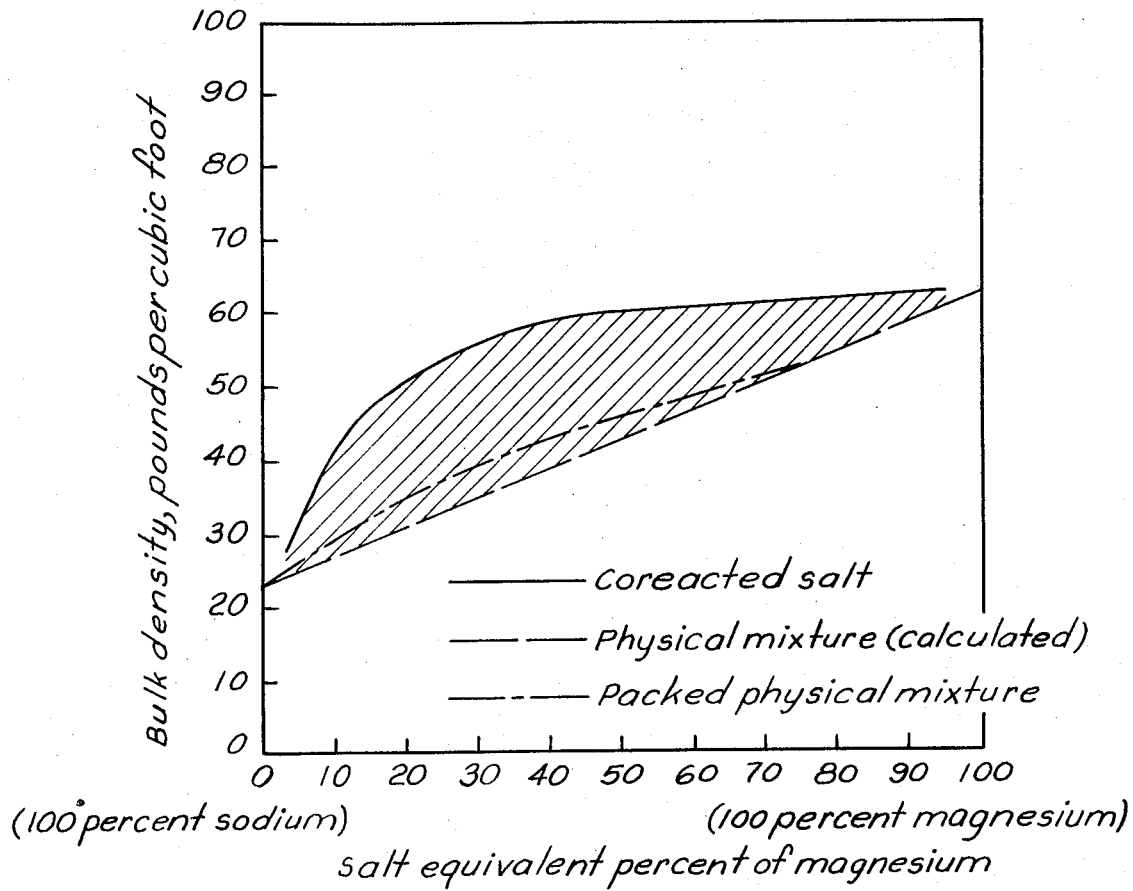

COREACTED SALTS OF POLYCHLOROCARBOXYLIC ACIDS

BACKGROUND OF THE INVENTION

1. Field of the Invention

This invention is broadly concerned with salts prepared by the reaction of an acid with a plurality of cations. Such salts can be conveniently referred to as "coreacted salts" to indicate that more than one cation is involved in their preparation.

2. Description of the Prior Art

Many polychlorocarboxylic acids and the alkali metal salts and alkaline earth metal salts thereof are known. Sodium polychlorocarboxylate salts, for example, sodium 2,2-dichloropropionate and sodium trichloroacetate, are powerful plant growth control agents. The representative sodium trichloroacetate, sodium 2,2-dichloroisovalerate, sodium 2,2,3-trichloropropionate, sodium 2,2-dichlorobutyrate and sodium 2,2-dichloropropionate salts have long been widely known and used as herbicides for the control of grasses.

In the preparation and handling of solid compounds to be employed as plant growth control regulators, it is desirable to prepare, store and ship the compounds in the form of dry compositions and to formulate treating compositions at the place and time of use by the addition of solid or liquid diluents or by dissolving compounds in water or other solvents. In such practices it is desirable to achieve as low moisture content as possible in the solid material, so that the cost and effort expended in shipping and handling the material per unit weight of active ingredient can be minimized. It is also desirable that the solid material be in a free flowing, easily dispersible form to facilitate its admixture with other diluents or its dispersion or solution in water or other solvents prior to use. Further, it is desirable that the bulk density of the solid salt compound be as high as possible, that is, that the weight of active material per unit volume of composition be high. High bulk densities provide improved utilization of storage space, transportation facilities, and packaging materials and reduce problems associated with dusting and drifting of small particles of material in the air when such material is handled.

The polychlorocarboxylic free acid plant growth regulants are liquid or solid, highly reactive, acidic materials requiring extensive precautions and special handling, storage and shipping procedures and materials. The alkali metal salts and alkaline earth metal salts are solid materials which are much less reactive and much more convenient to handle and use than the corresponding free acids. Such factors as low cost, ease of handling, high plant growth regulant activity, high water solubility, ease of preparation (due in part to high solubility of the cationic starting materials) and low concentrations of insoluble residues after plant or soil treatment have made the sodium salts the compounds of choice.

Thus, for herbicidal applications, it has long been desirable to prepare, store and ship polychlorocarboxylic acid herbicides in the form of solid sodium salt compositions. Such practices have been complicated due to the low bulk density and high hygroscopicity of the materials. For example, in the procedures typically employed in the preparation and drying of a representative sodium polychlorocarboxylate such as sodium 2,2-dichloropropionate, the product is initially obtained with moisture levels as high as about one percent. Solid sodium 2,2-dichloropropionate has a pronounced tendency to absorb moisture from the environment resulting in caking of the dried material into large masses, often containing several ounces or more material in a single solid mass. Often all the material in a single container will form a single solid cake mass. The tendency to cake makes the material difficult to handle and difficult to mix with other materials, or disperse and dissolve in water. Sodium, 2,2-dichloropropionate exhibits caking even at relatively low moisture levels, such as from 0.6 to 1.0 percent or more of water. Caking is enhanced by mechanical pressure, such as that encountered in storing large quantities of material in single containers, and the cakes so formed are difficult to fracture into particles of convenient handling size. The bulk density, that is the weight of material filling a unit volume, of sodium polychlorocarboxylates is low. For example, typical commercially prepared sodium 2,2-dichloropropionate generally has a bulk density of about 20–23 pounds of sodium 2,2-dichloropropionate per cubic foot of the salt compound. Freshly dried sodium 2,2-dichloropropionate typically is in the form of small, light particles, some of which are susceptible to suspension in air as a dust, thus creating handling problems with equipment such as pneumatic conveyors or package fillers. The bulk density of such preparations can be increased somewhat by such procedures as delaying the packaging of the dry material for a time sufficient for the material to settle, such as, about 24 hours. However, such settling procedure lengthens processing and increases the likelihood of moisture pick-up from the surrounding atmosphere during the settling period. Also, the bulk density typically obtained by permitting the sodium 2,2-dichloropropionate to settle remains low, generally on the order of about 25 pounds per cubic foot.

It would be desirable to provide solid salts of polychlorocarboxylic acids which have high bulk density, low hygroscopicity, and low tendency to cake; which are relatively easy to dry and handle; which have good water solubility and which have high potency as plant growth regulators.

SUMMARY OF THE INVENTION

This invention is directed to coreacted slats of polychlorocarboxylic acids and to methods for preparing and using the same, and is particularly directed to the coreacted polychlorocarboxylic acid salts wherein the cationic moiety of the salt is from about 3 to about 5, to about 7.5, to about 10, to about 15, to about 20, to about 25, to about 30, to about 40, to about 50, to about 60, to about 70, to about 80, to about 90, to about 95 salt equivalent percent by weight of alkaline earth metal and from about 5 to about 10, to about 20, to about 30, to about 40, to about 50, to about 60, to about 70, to about 75, to about 80, to about 85, to about 90, to about 92.5, to about 95, to about 97 salt equivalent percent by weight of alkali metal; and in which the polychlorocarboxylic acid moiety is a lower aliphatic acid of from two, to three, to four, to five carbon atoms, inclusive, substituted with from 2 to 3 chlorine substituents. In the present specification and claims the term "alkali metal" refers to sodium or potassium; and the term "alkaline earth metal" refers to magnesium or calcium.

The term "coreacted" is employed in the present specification and claims to indicate that the salt is obtained by the reaction of a polychlorocarboxylic acid ion with two or more metal cations, one of which is an alkaline earth metal cation and one of which is an alkali metal cation.

The alkali metal cations react with polychlorocarboxylic acid anions in a molar ratio of one to one, and the alkaline earth metal cations react with such anions in a molar ratio of 1:2. Thus the molar ratio of alkaline earth metal to alkali metal in a coreacted salt corresponds to the molar ratio of the alkaline earth metal cations and alkali metal cations reacted with a polychlorocarboxylate anion to prepare the salt. The molar ratios also correspond to the weight ratios of the cations. For the sake of convenience, the ratio of alkali metal cation to alkaline earth metal cation in a coreacted salt can be expressed by giving the amount of a particular cation as a percentage, by weight, of the coreacted polychlorocarboxylate which is equivalent to the weight percent of the corresponding polychlorocarboxylate salt of that cation. In such expression, the composition of the coreacted salt is thus stated for analytical convenience as though the coreacted salt were a mechanical mixture of an alkali metal salt with an alkaline earth metal salt. In the present specification and claims, the term "salt equivalent percent," when employed with respect to alkali metal or alkaline earth metal cationic moieties, in a coreacted polychlorocarboxylate salt, means and refers to the percentage by weight of an indicated cationic moiety considered as the polychlorocarboxylate salt of that cation. For example, the coreacted salt formed by the reaction of 1 atomic proportion each of potassium and calcium cations with 3 molar proportions of 2,2-dichloropropionate ion corresponds to equimolar proportions of potassium 2,2-dichloropropionate and calcium 2,2-dichloropropionate, considered as the single salts, and contains 35.8 salt equivalent percent by weight of potassium and 64.2 salt equivalent percent by weight of calcium.

The invention includes and is exemplified by each coreacted salt compound wherein the alkaline earth metal is present in any amount of from about 3 to about 95 salt equivalent percent of metal together with a corresponding value for the quantity of alkali metal between about 97 and about 5 salt equivalent percent. Representative intermediate ratios of alkali metal to alkaline earth metal include, for example, 31 to 69; 47.5 to 52.5; 66.33 to 33.67; 11 to 89; 75 to 25; and 40 to 60.

For the sake of convenience, the compounds defined above will be referred to herein simply as "coreacted salts". Individual coreacted salts will be named as alkali metal alkaline earth metal polychlorocarboxylates with the salt equivalent percentage of alkali metal or alkaline earth metal being given in parentheses immediately following the name of the alkali metal or the alkaline earth metal. Representative coreacted salt compounds of the invention, names as described above, include sodium (85) magnesium (15) 2,2-dichloropropionate, sodium (80) calcium (20) trichloroacetate, potassium (5.5) calcium (94.5) 2,2-dichlorobutyrate, potassium (46) sodium (4) magnesium (50) trichloroacetate, sodium (5) potassium (5) magnesium (50) calcium (40) 2,2-dichloropropionate, sodium (87) magnesium (13) 2,3,3-trichloropentanoate, sodium (94) magnesium (6) 2,2-dichloroisovalerate, potassium (55) calcium (5) magnesium (40) 2,4-dichlorobutyrate, and sodium (97) magnesium (3) 3,3-dichlorobutyrate.

The novel coreacted salts of the present invention are crystalline solid materials which generally decompose on heating before melting or vaporizing. The coreacted salts have characteristic physical properties such as high bulk densities, low hygroscopicity, high resistance to caking, solubility and dispersibility in water and organic solvents, particle configuration and density, free flowing properties and the like. The coreacted salt compounds are free flowing solids which are non-hygroscopic and non-caking and are readily dispersible in liquids and very soluble in water. The compounds have high bulk densities which are substantially greater than the bulk densities of mixtures of corresponding polychlorocarboxylate salts with single metals, the bulk density of a coreacted salt compound being generally about 1.1 or 1.2 or more times greater than the weighted average bulk density calculated and predicted for the corresponding physical mixture.

The coreacted salt compounds of the invention are useful for altering the growth of plants. The compounds have been found to be powerful inhibitors of the growth of chlorophyllous plants, and to be particularly useful as herbicides for the control of grasses. In employing the coreacted salt compounds for the control of plants, a plant or plant part or plant growth media is contacted with a plant growth-altering amount of one or more of the coreacted salts of the invention. The coreacted salts can be formulated with adjuvants and applied to plants, plant parts or plant growth media by procedures similar to those employed with the known herbicides. For such uses, preferred groups of coreacted salt compounds are those wherein the alkali metal cation is sodium; those wherein the alkaline earth metal cation is magnesium; those wherein the polychlorocarboxylate anion is trichloroacetate or 2,2-dichloropropionate, or 2,2-dichlorobutyrate and those wherein the coreacted salt contains from about 3 to about 25 to about 50 salt equivalent percent of magnesium. Particularly preferred coreacted salts of the invention are those coreacted salts of 2,2-dichloropropionic acid with sodium and magnesium, wherein the coreacted salt contains from about 5 to about 25 salt equivalent percent of magnesium, such coreacted salts having outstanding high bulk density, water solubility, low hygroscopicity and herbicidal properties.

The coreacted salt compounds of the invention are produced by the reaction of one or more alkali metal cation and one or more alkaline earth metal cation with an equivalent amount of a polychlorocarboxylate anion.

The coreacted salts are formed when the reactants supplying the required ions are contacted and mixed in an inert solvent. Representative inert solvents which can be employed as reaction media include water, methanol, ethanol, isopropanol, and mixtures thereof, aqueous media and particularly water being preferred. The reaction proceeds at the temperatures of from about 0° to about 70° C. and is complete in a short time. The coreacted salt product can be separated by conventional procedures such as evaporation of the reaction medium.

The reaction is conveniently carried out as a neutralization of the polychlorocarboxylic acid with a mixture of the metal hydroxides or as the metathetic reaction of salts of the moieties involved. Thus, the coreacted salt compounds can be prepared by the reaction of a water-soluble alkali metal salt or an alkali metal hydroxide and a water-soluble alkaline earth metal salt or an alkaline earth metal hydroxide with a polychlorocarboxylic acid anion in an inert solvent, preferably water, as a reaction medium. The polychlorocarboxylate starting material is conveniently employed as the free polychlorocarboxylic acid, and the alkali metal and alkaline earth metal reactants are conveniently employed as the hydroxide. In such procedure, the polychlorocarboxylic acid reactant is neutralized by the combination of the alkali metal hydroxide and alkaline earth metal hydroxide with the formation of water or reaction, and the coreacted salt products can be separated from the reaction mixture and obtained in high purity and high yield by conventional procedures for removing the water of reaction and the reaction medium.

The starting materials can also be employed in the form of salts, and when so employed it is preferred that the polychlorocarboxylate starting material be employed in the form of the alkali metal or alkaline earth metal salts with the particular alkali metal and alkaline earth metal to be obtained in the product, so that the individual alkali metal and alkaline earth metal polychlorocarboxylate starting materials employed correspond to the cationic and anionic moieties to be obtained in the coreacted salt product. Other salts of the starting materials can also be employed as reactants in the preparation of the coreacted salts by a metathesis reaction. For example, the alkali metal and alkaline earth metal salt starting material and the polychlorocarboxylate salt starting material can be selected so that the cationic moiety of the polychlorocarboxylate starting material and the anionic moiety or moieties of the alkaline earth metal and alkali metal salt starting materials form a metathesis product which is insoluble in the reaction mixture and thus easily removable by filtration, centrifugation, decantation or the like.

The reactants combine to form a polychlorocarboxylate salt compound when mixed together in any proportions; however, the identity of the product produced in a given instance is dependent upon the proportions of the cationic reactants employed. Thus, in the preparation of the coreacted salts of the invention, it is critical and essential that the alkali metal and the alkaline earth metal cationic reactants be employed in substantially the same proportions as are desired to be obtained in the final product. The alkali metal and alkaline earth metal hydroxide or salt reactants are thus employed in such proportions as to provide alkali metal cation in the reaction mixture in the amount of from about 5 to about 97 salt equivalent weight percent of the metal cation provided by such reactant. When substantially less than 5 salt equivalent percent or substantially more than 97 salt equivalent percent of the metal ion are provided by the alkali metal reactant, such as 1 or 2 or 98 or 99 weight percent, the product obtained will contain a corresponding ratio of alkali metal to alkaline earth metal and will not possess the desirable combination of plant growth altering properties, low hygroscopicity, high bulk density, resistance to caking, and free flowing form of the coreacted salt compounds of the invention. The relative proportions of the polychlorocarboxylate anion to the alkali metal and alkaline earth meta cation reactants is not critical and any unreacted excess of either reactant can be separated from the reaction mixture by conventional procedures or can be separated together with coreacted salt product. The alkali metal and alkaline earth metal cation reactant and the polychlorocarboxylate anion reactant combine in stoichiometric proportions to prepare the corresponding coreacted salt product, and in a preferred procedure the reactants are employed in substantially such proportions. Thus, it is preferred to employ sufficient polychlorocarboxylate to react with the alkali metal and alkaline earth metal reactants, without employing a significant excess of polychlorocarboxylate reactant.

Under a given set of reaction conditions such as temperature, solvents, concentration of reactants, whether or not a neutralization reaction or a metathesis reaction or a combination thereof is employed, or the like, minor variations in the proportions of the reactants may be required to produce a particular coreacted salt compound. In any such case, elemental analysis of the solid coreacted salt product will readily provide information as to the salt equivalent percentage of alkali metal or alkaline earth metal obtained in the product. When the product is found by elemental analysis to contain a higher or lower alkaline earth metal content (based on salt equivalent percent) than desired, the amount of alkaline earth metal cation reactant employed can be decreased or increased, respectively, to produce a product having the desired ratio. Simple and routine variations in the amount of the cationic reactants will enable one to determine the exact amount of such reactant to be employed under any given set of reaction conditions to obtain a product having a particular ratio of alkali metal to alkaline earth metal.

In a convenient procedure for the preparation of the coreacted salt of the invention, a water-soluble polychlorocarboxylate free acid or salt, an alkali metal hydroxide or salt and an alkaline earth metal hydroxide or salt are mixed together in an aqueous inert solvent, preferably water, in any order or fashion. In most cases, the reaction is substantially complete after the completion of the mixing of the reactants with the aqueous solvent. The product is conveniently separated from the reaction mixture by drying the mixture to remove the solvent. The removal of the solvent can be accomplished by conventional procedures such as evaporation under reduced pressure, spray drying, drum drying, evaporation at atmospheric pressure, boiling the mixture combinations of the above procedures or any other suitable procedure. For large scale operations, procedures such as drum drying or spray drying are conveniently employed. It is generally desirable to dry the product to constant weight; that is, regardless of the procedure employed, the product is dried to such extent that additional drying of a given amount of the product produces no substantial change in the weight thereof. For example, when a coreacted salt is dried to constant weight, air drying for one additional hour at a temperature of 50° to 110° C. in air having a relative humidity of from 40 to 80 percent results in a weight decrease of less than about 5 percent and preferably less than about 1 percent of the original dried weight. The coreacted salts are obtained in the form of free flowing, small, solid particles, substantially all of which will pass a 20 mesh screen and substantially all of which are pourable as a free-flowing solid under normal conditions of use. When dried to constant weight (weight decrease less than about one percent) by conventional equipment such as a spray drier, generally more than 95 percent of the coreacted salt particles will pass a 20 mesh screen with less than about 5 percent of such coreacted salt particles being susceptible to substantial drifting or dusting in still air or slowly moving air when the material is poured. The coreacted salt product can be employed directly to alter the growth of plants or it can be combined with various adjuvants or spray liquids, solvents and the like to prepare compositions which can be employed to alter the growth of plants.

In a preferred procedure a coreacted salt is prepared by the neutralization of an alkaline earth metal hydroxide with excess polychlorocarboxylic acid and the reaction of the resulting mixture of alkaline earth metal polychlorocarboxylate and polychlorocarboxylic acid with alkali metal hydroxide in aqueous solution. In such procedure, the amounts of alkali metal hydroxide and alkaline earth metal hydroxide to be employed are calculated on the basis of the salt equivalent weight percent of alkaline earth metal and alkali metal to be obtained in the final product. The contacting of the reactant is conveniently carried out by mixing the alkaline earth metal hydroxide directly with the polychlorocarboxylic acid and, optionally, a small amount of water, and thereafter adding to the resulting mixture an aqueous solution of the alkali metal hydroxide, together with sufficient water to dissolve all the reactants and/or product. When the alkaline earth metal hydroxide is mixed first, the reaction proceeds much more rapidly and produces a product of higher purity than is obtained when the alkali metal hydroxide is reacted first. The mixture can then be dried to constant weight to obtain the coreacted salt product as a free flowing solid. In another preferred procedure, an alkali metal polychlorocarboxylate salt and an alkaline earth metal polychlorocarboxylate salt are reacted together metathetically in the proportion of from about 3 to about 95 percent by weight of the total reactants employed being alkaline earth metal polychlorocarboxylate. Such procedure is carried out conveniently by mixing the salts together with an aqueous solvent in any convenient order or fashion, for example: by mixing the dried salt starting materials together and dissolving the mixture in water; by dissolving one dried salt reactant in a solution of the other salt reactant in water; or by mixing together aqueous solutions containing the two respective salt starting materials. The reaction mixture is then dried to constant weight to obtain the product as a crystalline free flowing solid. The product can be employed directly to control plant growth or it can be formulated in compositions for such use.

Preferred embodiments of the present invention employed in the control of plants include (1) methods which comprise applying to plants, plant parts or plant growth media a growth-altering amount or a growth-inhibiting amount of a coreacted salt compound and (2) concentrate compositions useful for altering plant growth which comprise at least one coreacted salt compound as the active ingredient in intimate admixture with at least one herbicide adjuvant of the group consisting of finely divided inert solids, granular solids, surface active dispersing agents, polyglycols, beeswax, paraffin waxes, water, organic solvents, nitrogen fertilizers, potassium fertilizers, phosphate fertilizers, urea, metaphosphates, etc. Particularly contemplated as desirable concentrate compositions are those which comprise at least one coreacted salt compound as active ingredient in intimate admixture with at least one material of the group consisting of finely divided inert solids; surface active dispersing agents and lower alkyl ethers of polyhydroxy alcohols including diglycols, triglycols and tetraglycols of the ethylene or propylene or trimethylene series wherein the lower alkyl moiety contains from one to 10 carbon atoms, inclusive; and polyalkyleneglycols of the trimethylene, ethylene or propylene series such as polyethyleneglycol and trimethyleneglycol having an average molecular weight of from about 106 to 2,000, inclusive. In these compositions, and especially those pointed out as particularly contemplated, the adjuvant cooperates with the coreacted salt compounds so as to facilitate the invention and obtain an improved result.

The term "finely divided inert solids" as herein employed refers to materials whose primary The term "finely divided inert solids" as herein employed refers to materials whose primary function is not as a dispersant of coreacted salt compounds in water or organic solvent, but as a carrier for dust compositions. Inclusive of such materials are chalk, talc, gypsum, powdered walnut shell, salt, sugar, etc.

The expression "surface active dispersing agent" as herein employed is intended to include all agents which are capable of acting at the interfacial surface between the coreacted salt compound or composition and water or organic solvent as the dispersion medium, facilitating thereby the dispersion of the coreacted salt in water or organic solvent to form aqueous and emulsifiable concentrates, etc. The term is inclusive of solid emulsifying agents such as finely divided bentonite, pyrophyllite, fuller's earth, attapulgite, silica, other clays and mineral carriers as well as liquid and solid ionic and non-ionic wetting and dispersing agents, alkaline earth metal caseinates, alkyl aryl sulfonates, sulfonated oils, complex organic ester derivatives, complex ether alcohols, sucrose tallowates, condensation products of alkylene oxides with phenols and organic acids, polyoxyethylene derivatives of sorbitan esters or sugar esters, mahogany soaps and the like. Other suitable surface active agents may be found in "Detergents and Emulsifiers, Up To Date," written and published by John W. McCutcheon, Inc., Morristown, New Jersey (1967).

The supplying of a growth-altering amount of one or more of the coreacted salt compounds in or on the growth medium or upon the above-ground or below-ground surfaces of plants or plant parts is essential and critical for the practice of the plant-treating method of the invention. The exact dosage to be supplied is dependent upon the particular type of result to be achieved. In non-selective application to plant growth media, including areas such as railway beds, graded or paved areas, as well as soil, good results are obtained when the coreacted salt compounds are distributed at a rate of from about 15 to about 20, to about 80 pounds or more per acre and through such a cross-section of the soil as to provide for the presence therein of an effective concentration of the treating agent. Usually, no significant advantage is gained by application of more than about 80 pounds per acre. In such application, it is desirable that the compound be distributed to a depth of at least 0.5 inch and at a substantially uniform dosage of at least about 10 pounds per acre inch of soil. The coreacted salts are not long-enduring in soil and no long-lasting sterilization of the soil is occasioned by weed or grass control operations. Maximum benefits are typically obtained by application of the coreacted salts to the above-ground portions, such as the stems, leaves and foliage, of plants. In non-selective operations the coreacted salts can be applied at rates of from about 10, to about 20, to about 25, to about 50, to about 80 or more pounds per acre to stands of plants. In selective applications to foliage for the control of many undesirable weeds, and especially the seedlings of small seeded grasses, such as Bermuda grass, crab grass and quack grass in crops such as sugar beets or in orchard floors, or in ground cover such as dichondra or ivy, a substantially uniform dosage of from about 1 to about 5, to about 10 pounds of coreacted salt compound per acre may be employed, or the foliage can be contacted with compositions containing from about 5 to about 10 to about 15 pounds of coreacted salt compound per 100 gallons of spray composition.

The coreacted salt compounds may be modified with one or a plurality of additaments or herbicide or growth-altering adjuvants such as water, petroleum distillates or other liquid carriers, surface active dispersing agents and finely divided inert solids. Depending upon the concentration of the coreacted salt, such augmented compositions are adapted to be distributed in the soil, on the soil or applied to plants or plant parts, or employed as concentrates and subsequently diluted with additional inert carrier to produce the ultimate treating compositions. The required amount of the coreacted compound conveniently can be supplied per acre treated in from about 5 to about 60 gallons or more of the liquid carrier or in from about 5 to about 40 pounds or more of inert solid carrier. The exact concentration of the coreacted salt compound to be employed in compositions for application to plants or growth media is not critical and can vary considerably provided the required dosage of effective agent is supplied in or on the growth media, on the surfaces of seeds, or upon the above-ground surfaces of plants including the stems, branches and leaves. The concentration of the coreacted salts in liquid compositions employed to supply the desired dosage generally can vary from about 0.5 to about 50 percent by weight, and in solid compositions employed as dusts or as concentrates, the compounds can be present in concentrations of from 1 to 95 or up to 98 percent by weight.

The quantity of treating composition to be applied can vary considerably provided that the required dosage of the coreacted salt compound is applied in sufficient of the finished composition to cover adequately the vegetation to be treated or to facilitate the penetration and distribution of the active ingredients in growth media. In the treatment of seedling weeds, good coverage is obtained when using from 10 to 60 gallons of finished spray composition per acre. Where large succulent vegetation is concerned, it is frequently desirable to employ up to 100 gallons or more of the finished spray composition per acre to assure good complete coverage of the above-ground portion of the vegetation. In the application of dusts to plant foliage, good results are obtained with from about 20 to 40 pounds of finished dust per acre, the only requirement being that the required dosage be supplied in sufficient dust to achieve good coverage of the foliage.

Liquid compositions containing the desired amount of active ingredient may be prepared by dissolving the compounds in water or by dispersing them in organic liquids with or without the aid of a suitable surface active dispersing agent. The exact steps to be employed in preparing the compositions are within the knowledge of those skilled in the art. Suitable organic liquid carriers include the agricultural spray oils and the petroleum distillates such as diesel fuel, kerosene, fuel oil, naphthas and Stoddard solvent. The aqueous compositions can contain one or more water-immiscible organic liquid such as petroleum oils and distillates, toluene, xylene, cumene and other aromatic hydrocarbon solvents, chlorinated aliphatic hydrocarbons, isoparaffin oil and other aliphatic hydrocarbon solvents. Water-miscible organic liquids include acetone, methyl ethyl ketone, cyclohexanone, alcohols, dimethylformamide, ether alcohols and ethyleneglycols marketed under trade names such as DOWANOL and CELLOSOLVE and esters such as ethyl acetate, sec-butyl acetate and isopropyl acetate. Usually, an aqueous carrier which includes a small amount of a water-miscible organic liquid is preferred.

When operating with the compounds of the present invention, growth-altering amounts of the coreacted salt compounds are contacted with plants and plant parts by application to plants and plant parts or are dispersed in soil or growth media in any convenient fashion. Applications to growth media may be carried out by simply mixing with the media, by undisturbed application to the surface of the soil, by applying to the surface of the soil and thereafter dragging or discing into the soil to the desired depth or by employing a liquid carrier to accomplish the penetration and impregnation. The application of spray or dust compositions to the surface of growth media or to the above-ground surfaces of plants can be carried out by conventional methods, e.g., power dusters, boom and hand sprayers, spray dusters, aerial sprayers and the like.

DESCRIPTION OF PREFERRED EMBODIMENTS

The following examples are illustrative of the invention but are not to be construed as limiting.

EXAMPLE 1

About 937 pounds of 2,2-dichloropropionic acid are placed in a reaction vessel made of acid resistant material and 3 gallons of water are added thereto. 30.4 Pounds of magnesium hydroxide is added portionwise to the mixture with agitation. The reaction mixture is diluted by the addition of 3.5 gallons of water, and 40 gallons of an aqueous solution containing 45 percent sodium hydroxide by weight is then added and mixed with the aqueous mixture. The sodium (85) magnesium (15)

2,2-dichloropropionate product is obtained by drying the mixture with a spray drier with an inlet air temperature of about 270° C. and an exit air temperature of about 105° C. and an air flow rate of about 2,500 cubic feet of air per minute. The reaction mixture is fed to the drier at a feed rate of about 5,300 pounds of reaction mixture per hour. One pound of the coreacted salt product dried by such procedure is found to vary in weight by less than 1 percent by weight after drying for an additional period of 1 hour under atmospheric pressure in air at a temperature of 80° C. with the air having a relative humidity of about 45 percent. The product is filled into drums in the amount of 50 pounds of product per drum. The bulk density of the product is determined by dividing the weight of product in each drum by the volume of product in the drum and calculating the average bulk density of the product for the drums filled. In such operations, the sodium (85) magnesium (15) 2,2-dichloropropionate product is found to have a bulk density of 46.7 pounds per cubic foot. Sodium 2,2-dichloropropionate prepared and dried in a similar procedure is found to have a bulk density of 23 pounds per cubic foot, and magnesium 2,2-dichloropropionate prepared and dried by a similar procedure is found to have a bulk density of 62.3 pounds per cubic foot. Based on these observations the bulk density expected for a mixture containing 15 percent by weight of magnesium 2,2-dichloropropionate and 85 percent by weight of sodium 2,2-dichloropropionate is calculated to be (62.3) (0.15) plus (23) (0.85) or about 28.9 pounds per cubic foot.

EXAMPLE 2

The procedure of Example 1 is repeated, without substantial variation, with the exception that the amount of magnesium hydroxide and sodium hydroxide employed are varied to obtain coreacted salt products containing various salt equivalent percentages of magnesium. In each such repetition of the procedure of Example 1, the material is dried to constant weight and packed in containers in the amount of 50 pounds of coreacted salt per container. The volume of coreacted product in each 50 pound lot is then divided into 50 to obtain the bulk density of the lot, and the average bulk density for each coreacted salt product is calculated. The results of these operations are set out in the FIGURE of the drawing wherein the bulk density of the product in pounds per cubic foot is represented on the vertical axis and salt equivalent weight percent of magnesium in the product is set out on the horizontal axis. The bulk densities obtained with the coreacted salt products are represented by the solid line. The expected bulk density calculated for the corresponding physical mixtures of the sodium 2,2-dichloropropionate and magnesium 2,2-dichloropropionate is represented in the FIGURE of the drawing by the straight broken line, said line representing the weighted arithmetic average of the bulk densities of the two individual salts. The shaded area between the solid line and the straight broken line thus represents the difference between the bulk densities of the coreacted salts and the bulk densities calculated for corresponding physical mixtures of the individual salts.

As a check, physical mixtures of sodium 2,2-dichloropropionate with magnesium 2,2-dichloropropionate are prepared containing various weight ratios such as 75, 50 or 25 parts by weight of the sodium salt to 25, 50 or 75 parts, respectively, by weight of the magnesium salt. The physical mixtures are allowed to settle, and the drums containing each mixture are shaken to induce further settling and packing of the mixtures before bulk density determinations are made. The bulk density obtained with the packed physical mixtures is represented in the Figure of the drawing by the curved dot-dash line.

Similar results are obtained when the coreacted salt product is dried to constant weight on a drum drier heated by steam under a pressure of 70 pounds per square inch, or when the reaction mixture is dried under reduced pressure at a temperature of about 70° C. until crystallization of the coreacted salt is substantially complete followed by drying to constant weight in air at a temperature of 50° C. and relative humidity of about 60 percent. The products so obtained have higher bulk densities than the bulk densities calculated for physical mixtures of individual salts dried by the same procedure.

EXAMPLE 3

Several separate coreacted salts of Example 2 containing magnesium in amounts of 4.8, 7.0, 9.0, 11.2, 12.4, 17.4, 23.0, 50, 75, and 95 salt equivalent percent are held in separate 50 pound drums for three weeks. Sodium 2,2-dichloropropionate and magnesium 2,2-dichloropropionate prepared by similar procedures are similarly held for three weeks to serve as checks. At the end of the holding period, each sample is separately examined for caking and handling properties. These observations reveal that more than ninety percent of each of the coreacted salts of Example 2 passes a screen having 100 meshes to the inch and substantially all of each coreacted salt passes a 20 mesh screen. Substantial amounts, generally in excess of 25 percent of the total material, of the sodium 2,2-dichloropropionate are retained on both a 20 mesh or a 100 mesh screen. The magnesium 2,2-dichloropropionate is found to be extremely hygroscopic, picking up substantial amounts of water from the atmosphere during storage and evaluation. The magnesium 2,2-dichloropropionate is difficult to handle, leaving viscous deposits of deliquesent material on surfaces of containers, funnels, screens and the like employed in handling the salt material. The coreacted salts are observed to be fine crystalline free flowing solids, while the sodium 2,2-dichloropropionate shows extensive caking, with solid cakes over 50 grams in weight being observed.

EXAMPLE 4

A.

Trichloroacetic acid (2,366 grams; 14.5 moles) is mixed with 1,844 grams of water and neutralized by admixture with 1,168 grams of water containing 50 percent by weight of sodium hydroxide (14.5 moles). A minor amount of sodium nitrite is added to the mixture to serve as a corrosion inhibitor. The mixture (A) is employed to supply sodium ion and trichloroacetate ion starting materials for the preparation of coreacted salts of the invention.

B.

Trichloroacetic acid (2,318.3 grams; 14.2 moles) is neutralized with magnesium hydroxide (14.2 equivalents; 7.1 moles) and mixed with 2,204 grams of water. A minor amount of sodium nitrite is added as a corrosion inhibitor. The mixture is employed as a source of magnesium, sodium, and trichloroacetate in preparing coreacted salts.

EXAMPLE 5

Portions of compositions A and B of Example 4 are mixed together in varying proportions to prepare representative coreacted sodium magnesium trichloroacetate salts of the invention in aqueous solution. The solutions are then spray dried in a procedure similar to that of Examples 1 and 2 to obtain the coreacted salt products as free flowing crystalline solids. Separate portions of composition A and composition B are separately spray dried in an identical procedure. The magnesium and sodium content of the spray dried coreacted salt products, the bulk density of the products and the expected bulk density calculated for the coreacted salt products are set out in the following table.

METAL CONTENT (Parts per 100 parts by weight)

| Parts by Weight of Mixture Employed | | Bulk Density (Lbs. per cu. ft.) | |
|---|---|---|---|
| A | B | Observed | Expected |

| | | | |
|---|---|---|---|
| 100 | 0 | 28.6 | — |
| 75 | 25 | 37.1 | 30.1 |
| 50 | 50 | 34.0 | 31.5 |
| 0 | 100 | 34.3 | — |

EXAMPLE 6

Trichloroacetic acid is neutralized with an equivalent amount of calcium hydroxide and the resulting calcium trichloroacetate salt is diluted with water to prepare an aqueous composition containing 50 percent by weight of calcium trichloroacetate. A separate composition containing 50 percent by weight of sodium trichloroacetate is similarly prepared. 50 Parts by weight of the calcium trichloroacetate solution are then mixed with 50 parts by weight of the sodium trichloroacetate solution to prepare an aqueous solution containing 50 percent by weight of coreacted sodium (50) calcium (50) trichloroacetate. A 50 percent aqueous solution of coreacted sodium (75) calcium (25) trichloroacetate is similarly prepared by mixing together 75 parts by weight of the sodium trichloroacetate solution and 25 parts by weight of the calcium trichloroacetate solution. Equal volumes of each solution are separately spray dried. The sodium (50) calcium (50) trichloroacetate and sodium (75) calcium (25) trichloroacetate coreacted salt products are obtained as fine, free flowing crystalline solids having bulk densities of 38.6 and 48.6, respectively, pounds per cubic foot. Analysis of acid content as trichloroacetic acid, indicates that the coreacted sodium (50) calcium (50) trichloroacetate and sodium (75) calcium (25) trichloroacetate contain 32.7 and 41.5 respectively, pounds (trichloroacetic acid equivalent) per cubic foot. The sodium trichloroacetate and calcium trichloroacetate salts are found to have bulk densities of 29.1 and 34.3, respectively, pounds per cubic foot and to contain 25.2 and 27.6 pounds respectively, (trichloroacetic acid equivalent) per cubic foot. These data indicate that the coreacted sodium (75) calcium (25) trichloroacetate salt, for example, provides bulk densities about 190 or 141, respectively, percent greater than the sodium or calcium salts, and provides about 164 or about 150, respectively, percent higher trichloroacetic acid equivalents per unit volume than the sodium and calcium salt.

EXAMPLE 7

A series of separate physical mixtures are prepared by intimately mixing together solid sodium 2,2-dichloropropionate and solid magnesium 2,2-dichloropropionate in various representative ratios from 5 parts by weight of the sodium salt with 95 parts by weight of the magnesium salt to 97 parts by weight of sodium salt with 3 parts by weight of magnesium salt, and including intermediate ratios such as 15:85, 25:75, 50:50, 75:25, and 85:15. The bulk density of each mixture is determined, and the mixtures are then dissolved in water to form a series of solutions each containing 40 percent solids, by weight. The solutions are then dried to obtain the corresponding coreacted salt products. The bulk density of each coreacted salt is determined and the percentage difference in bulk density from the corresponding mixture is calculated by dividing the bulk density of each coreacted salt by the bulk density of the mixture employed in the preparation thereof and multiplying the product by 100. In such operations, the coreacted salt products are consistently found to have substantially higher bulk densities than the corresponding mixtures of salts. The coreacted salts which contain from about 10 to about 25, to about 50 salt equivalent percent of magnesium are observed to have bulk densities 120 percent or more greater than the corresponding mixtures. The coreacted salt products are observed to retain free flowing characteristics after storage under conditions of ambient temperature and humidity.

EXAMPLE 8

In procedures similar to those described in Examples 1 and 2, coreacted salts of one of 2,2-dichlorobutyric acid 2,2-dichloroisovaleric acid are prepared by neutralizing magnesium hydroxide with an excess of one of the named acids and neutralizing the resulting mixture with aqueous sodium hydroxide. The products are obtained by spray drying. Such coreacted salts having 3, 5, 10, 20, 50, 75 and 95 salt equivalent percent of magnesium are found to have substantially higher bulk densities than predicted from the bulk densities of the corresponding spray dried sodium salt and magnesium salt.

EXAMPLE 9

A series of separate compositions are prepared by separately dissolving one of sodium (3) magnesium (97) 2,2-dichloropropionate, sodium (90) calcium (10) trichloroacetate, sodium (87.5) magnesium (12.5) 2,2-dichloropropionate and sodium (85) magnesium (15) 2,2-dichloropropionate in water to prepare aqueous spray compositions containing one pound of the active ingredient per gallon of ultimate mixture. Each coreacted salt disperses and dissolves readily. These compositions are applied to the foliage of separate stands of seedlings of various weed species with conventional spraying equipment at rates sufficient to supply substantially uniform dosages of 15 pounds of a single coreacted salt composition per acre. Similar stands of the same weed species are left untreated to serve as checks.

Four weeks after spraying, the treated stands are examined to ascertain what control of the growth of plants has been obtained. In the stands treated with one of the coreacted salts, substantially complete control of Johnson grass, Japanese millet, barnyard grass, foxtail and morning glory is obtained. At the time of observations, the check areas show vigorously growing stands of the named plant species.

EXAMPLE 10

Sodium (80) magnesium (20) 2,2-dichloropropionate is dispersed in water to prepare a dispersion containing 0.5 percent of coreacted salt by weight of ultimate mixture. The spray composition is applied to the foliage of a mixed stand of the vigorously growing seedlings of various grass species and broad leaf weeds at a rate of 300 gallons of spray per acre. At the time of the application, the seedling plants are between 2 and 4 inches tall. The treatment is carried out with conventional spraying equipment. Adjacent plots supporting stands of the same plant species are left untreated to serve as checks.

After 4 weeks, the treated plots are examined to ascertain what control of the growth of seedling plants has been obtained. The observations show that the coreacted salt compound gives substantially complete controls and kills of the weeds, including Japanese millet, cattail, barnyard grass, spiny clotbur, morning glory, foxtail and radish, while heavy stands of the named plant species are found in the check plots.

In substantially the same procedure, excellent controls and kills of Japanese millet and foxtail are obtained when seedling plants of the named species are sprayed with aqueous compositions containing one percent by weight of one of sodium (87.5) calcium (17.5) trichloroacetate, potassium (90) calcium (10) 2,2-dichloropropionate, sodium (95) magnesium (5) 2,2-dichlorobutyrate or sodium (87.5) magnesium (12.5) 2,2-isovalerate.

EXAMPLE 11

Concentrate compositions are prepared as follows:
A. 20 Parts by weight of sodium (92) magnesium (8) 2,2-dichloropropionate, 10 parts by weight of potassium (80) calcium (20) trichloroacetate, 20 parts by weight of diethylene glycol methyl ether, 50 parts by weight of a petroleum distillate boiling below 400° F. and 10 parts by weight of Triton X-100 (isooctylphenyl polyethoxyethanol) are mechanically mixed together to obtain a water-dispersible composition.

B. 10 Parts by weight of sodium (85) magnesium (15) 2,2-dichloropropionate, 2 parts by weight of sodium (80) calcium (20) 2,2-dichloroisovalerate, 90 parts by weight of attapulgite clay and 5 parts by weight of Nacconal NR (sodium alkylaryl sulfonate) are blended and hammermilled together.

C. 5 Parts by weight of sodium (75) magnesium (25) 2,2-dichlorobutyrate, 10 parts by weight of tetraethyleneglycol, 10 parts of bentonite and 120 parts by weight of powdered walnut shells are blended and hammermilled together to prepare a dust composition.

D. 60 Parts by weight of sodium (87) magnesium (13) 2,2-dichloropropionate and 40 parts of attapulgite clay are blended and hammermilled together to produce a dust composition which can also be employed as a water-dispersible concentrate.

E. 310 Parts by weight of trichloroacetic acid and 630 parts by weight of 2,2-dichloropropionic acid are mixed together with 80 parts by weight of water. 29 Parts by weight of magnesium hydroxide are added together with 100 parts by weight of water. 220 Parts by weight of sodium hydroxide are added to the resulting mixture with sufficient water to provide about 50 percent solids by weight of ultimate mixture. The mixture is spray dried by a procedure similar to that of Example 1 to obtain a mixture of coreacted sodium magnesium salts of trichloroacetic acid and 2,2-dichloropropionic acid. The dried product is then mixed on a hammermill with 30 parts by weight of an alkylated benzene sulfonate surfactant and 30 parts by weight of a mixture of mono-, di- and tripropyleneglycol methyl ethers to prepare a water dispersible mixture.

F. 68 Parts by weight of sodium (87.6) calcium (12.4) trichloroacetate and 140 parts by weight of sodium (84) magnesium (16) 2,2-dichloropropionate are mixed together with 45 parts of a butylphenoxy polypropyleneoxy polyethyleneoxy ethanol surface active dispersing agent. Twenty pounds of the concentrate composition are dispersed in 100 gallons of water and employed as a spray to control Johnson grass, Bermuda grass, cattails, foxtail and the like.

What is claimed is:

1. A coreacted alkali metal - alkaline earth metal polychlorocarboxylate salt containing from about 3 to about 95, inclusive, salt equivalent percent by weight of alkaline earth metal wherein the polychlorocarboxylate moiety is a member of the group consisting of trichloroacetate and 2,2-dichloropropionate, said coreacted salt being in the form of a water soluble free flowing solid of high bulk density, having a bulk density at least about 1.1 times greater than the weighted average bulk density calculated for a corresponding mechanical mixture of an alkali metal salt with an alkaline earth metal salt, said coreacted salt being the product of a process comprising the steps of providing an aqueous solution of the polychlorocarboxylate anion and the alkali metal and alkaline earth metal cations said cations being employed in the amounts of from about 3 to about 95, inclusive, salt equivalent percent of alkaline earth metal and from about 97 to about 5, inclusive, salt equivalent percent of alkali metal, and drying said solution to constant weight.

2. A salt of claim 1 wherein the alkaline earth metal is magnesium.

3. A salt of claim 1 wherein the alkali metal is sodium.

4. A salt of claim 1 wherein the alkali metal is sodium and the alkaline earth metal is magnesium.

5. A salt of claim 4 containing from about 5 to about 25, inclusive, salt equivalent percent of magnesium.

6. A coreacted sodium-magnesium 2,2-dichloropropionate salt containing from about 5 to about 25, inclusive, salt equivalent percent by weight of magnesium, said coreacted salt being in the form of free flowing, small, solid particles, substantially all of which will pass a 20 mesh screen, said coreacted salt being further characterized by a bulk density at least about 1.1 times the bulk density of a corresponding mechanical mixture of sodium 2,2-dichloropropionate and magnesium 2,2-dichloropropionate; said coreacted salt being produced by a process which comprises providing an aqueous solution of a mixture consisting essentially of sodium, magnesium and 2,2-dichloropropionate ions, said mixture containing from about 5 to about 25, inclusive, salt equivalent percent of magnesium, and drying said solution to constant weight.

7. A coreacted salt of claim 1 wherein the coreacted salt is produced by a process further comprising the steps of neutralizing an alkaline earth metal hydroxide with an excess of the polychlorocarboxylic acid, and mixing the resulting mixture with an aqueous solution of alkali metal hydroxide to produce the aqueous solution of alkali metal and alkaline earth metal cations and polychlorocarboxylate anion.

8. A coreacted salt of claim 1 wherein the coreacted salt is prepared by a process comprising mixing together an alkali metal polychlorocarboxylate salt, an alkaline earth metal polychlorocarboxylate salt, and sufficient water to provide the aqueous solution of polychlorocarboxylate anion, alkali metal and alkaline earth metal cations, said salts being employed in the amounts of from about 3 to about 95, inclusive, percent by weight of alkaline earth metal salt and correspondingly from about 97 to about 5, inclusive, percent by weight of alkali metal salt.

9. A coreacted salt of claim 6 wherein the coreacted salt contains about 15 salt equivalent percent by weight of magnesium.

10. A coreacted salt of claim 6 wherein the salt contains from about 10 to about 20, inclusive, salt equivalent percent by weight of magnesium.

11. A coreacted salt of claim 7 wherein the aqueous solution is provided by mixing magnesium hydroxide with excess 2,2-dichloropropionic acid; mixing the resulting mixture with an aqueous solution of sodium hydroxide; and adding sufficient water to provide a substantially complete solution prior to drying.

12. A method comprising mixing together an alkaline earth metal hydroxide and an alkali metal hydroxide with a polychlorocarboxylic acid selected from the group consisting of trichloroacetic acid and 2,2-dichloropropionic acid in the presence of sufficient water to dissolve the resulting reaction mixture, the alkali metal hydroxide and the alkaline earth metal hydroxide being employed in the amounts of from about 3 to about 95, inclusive, salt equivalent percent of alkaline earth metal and from about 97 to about 5, inclusive, salt equivalent percent of alkali metal, the mixing being carried out by mixing the alkaline earth metal hydroxide with the polychlorocarboxylic acid; mixing an aqueous solution of the alkali metal hydroxide with the resulting mixture, and thereafter drying the resulting reaction mixture to constant weight.

13. The method of claim 12 wherein the mixing steps are carried out at a temperature of from about 0° to about 70°C.

14. The method of claim 12 wherein the mixture is spray dried to constant weight.

15. The method of claim 12 wherein the alkali metal and alkaline earth metal hydroxides are employed in the amounts of from about 5 to about 25, inclusive, salt equivalent percent of alkaline earth metal and from about 95 to about 75, inclusive, salt equivalent percent by weight of alkali metal, and wherein the polychlorocarboxylic acid is 2,2-dichloropropionic acid.

* * * * *